(12) United States Patent
Ogawa et al.

(10) Patent No.: US 10,336,364 B2
(45) Date of Patent: Jul. 2, 2019

(54) VEHICLE CONTROL DEVICE

(71) Applicant: Mazda Motor Corporation, Aki-gun, Hiroshima (JP)

(72) Inventors: Daisaku Ogawa, Hiroshima (JP);
Daisuke Umetsu, Hiroshima (JP);
Osamu Sunahara, Hiroshima (JP);
Yasunori Takahara, Hiroshima (JP);
Yuichiro Akiya, Hiroshima (JP);
Chikako Ohisa, Aki-gun (JP); Atsushi Yamasaki, Hiroshima (JP); Keiichi Hiwatashi, Aki-gun (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/899,688

(22) Filed: Feb. 20, 2018

(65) Prior Publication Data

US 2018/0265118 A1 Sep. 20, 2018

(30) Foreign Application Priority Data

Mar. 17, 2017 (JP) ................................ 2017-052423

(51) Int. Cl.
| | |
|---|---|
| *G05B 17/00* | (2006.01) |
| *B62D 5/04* | (2006.01) |
| *G05D 1/08* | (2006.01) |
| *B60W 30/18* | (2012.01) |
| *B60W 10/06* | (2006.01) |

(52) U.S. Cl.
CPC ........... *B62D 5/0463* (2013.01); *B60W 10/06* (2013.01); *B60W 30/18* (2013.01); *G05D 1/08* (2013.01); *B60W 2510/0661* (2013.01)

(58) Field of Classification Search
CPC ..................................................... B62D 5/0463
USPC ........................................................... 318/689
See application file for complete search history.

(56) References Cited

U.S. PATENT DOCUMENTS

| | | | | |
|---|---|---|---|---|
| 2006/0259225 | A1* | 11/2006 | Ono ...................... | B60G 17/016 701/82 |
| 2014/0373810 | A1* | 12/2014 | Grob ................... | F02D 41/0087 123/349 |
| 2015/0175009 | A1* | 6/2015 | Beever ................. | B60K 7/0007 701/22 |
| 2016/0297439 | A1* | 10/2016 | Inoue .................. | B60W 10/184 |
| 2016/0297478 | A1* | 10/2016 | Inoue ..................... | B60T 8/246 |

* cited by examiner

FOREIGN PATENT DOCUMENTS

JP 2014166014 A 9/2014

*Primary Examiner* — Erick D Glass
(74) *Attorney, Agent, or Firm* — Alleman Hall Creasman & Tuttle LLP

(57) ABSTRACT

A vehicle control device is provided, which includes an engine, an engine control mechanism configured to control torque generated by the engine, a processor configured to execute a vehicle attitude controlling module to control attitude of a vehicle by controlling the engine control mechanism to reduce the torque so as to decelerate the vehicle, when a condition that the vehicle is traveling and a steering angle related value that is related to a steering angle of a steering device increases is satisfied, and a torque reduction amount setting module to set the reduction amount of the torque to be larger as a combustion frequency of the engine per unit time decreases. The vehicle attitude controlling module controls the engine control mechanism to reduce the torque based on the set reduction amount.

9 Claims, 9 Drawing Sheets

VEHICLE CONTROL DEVICE

TECHNICAL FIELD

The present disclosure relates to a vehicle control device, and particularly to a vehicle control device which achieves a desired vehicle attitude (vehicle behavior) by performing an engine control.

BACKGROUND OF THE DISCLOSURE

Conventionally, devices which control the behavior of a vehicle to a safer direction when the behavior of the vehicle becomes unstable due to a slip, etc. (such as an antiskid brake system (ABS)) are known. For example, devices which detect that behavior such as understeering or oversteering occurs in the vehicle during cornering, etc. of the vehicle, and apply a suitable deceleration to the vehicle so that the behavior is controlled are known.

Meanwhile, vehicle movement controllers are known, which adjust a deceleration during cornering to control loads applied to front wheels which are steerable wheels so that a series of operations by a vehicle driver (breaking, steering-in, accelerating, steering-back, etc.) during cornering of a vehicle in a normal traveling state become natural and stable, unlike the above control performed for safety improvement in the traveling state where the behavior of the vehicle becomes unstable.

Further, JP2014-166014A discloses a behavior control device for a vehicle which reduces a driving force (torque) of the vehicle according to a yaw-rate related amount which corresponds to a steering operation by a vehicle driver (e.g., yaw acceleration) to quickly decelerate the vehicle when the driver starts the steering operation, so that a sufficient load is quickly applied to front wheels which are steerable wheels. According to this behavior control device, since the loads are quickly applied to the front wheels when the steering operation is started, a frictional force between the front wheels and a road surface increases, and a cornering force of the front wheels increases. Therefore, turnability of the vehicle in an early stage of curve entry improves, and a response to the steering-in operation (steering stability) improves. Thus, a vehicle behavior intended by the driver is achieved.

Conventionally, arts for changing an operation mode of a multi-cylinder engine between an all-cylinder operation and a reduced-cylinder operation according to an operating state of a vehicle (i.e., cylinder deactivation engine) are known. In the all-cylinder operation, combustion of a mixture gas is performed in all cylinders, and in the reduced-cylinder operation, the combustion of the mixture gas in one or some of the cylinders is suspended. In the reduced-cylinder operation of such an engine where the reduced-cylinder operation is performable (i.e., cylinder deactivation engine), the combustion in some of the cylinders of which the order of combustion is not successive is prohibited, and the combustion in the other cylinders is sequentially performed. Therefore, a combustion time interval in the reduced-cylinder operation is longer than that in the all-cylinder operation.

For this reason, in a case where the behavior control device of JP2014-166014A is applied for the cylinder deactivation engine and reduces an engine torque to decelerate the vehicle according to the steering operation by the driver (executes a vehicle attitude control), a response time from issuance of a torque reduction request until an actual start of the vehicle attitude control upon reaching for the first time a combustion timing of the cylinder after the request issuance, varies between the all-cylinder operation and the reduced-cylinder operation. Therefore, when the vehicle attitude control is performed in the reduced-cylinder operation, the response of the torque reduction by the vehicle attitude control tends to be worse than when the vehicle attitude control is performed in the all-cylinder operation. As a result, various time delays occur, such as a timing at which the cornering force of the front wheels increases due to the torque reduction and a timing at which a reactive force of a steering wheel increases in accordance with the cornering force increase, and a desired vehicle attitude during a turn is not achieved and the driver feels a sense of discomfort.

Note that this response degradation, which is described above to occur in the reduced-cylinder operation of the cylinder deactivation engine, also tends to occur in an engine operating condition where the number of times that the combustion is performed (combustion frequency) per unit time is relatively small (e.g., within a low engine speed operating range). That is, in the reduced-cylinder operation or at a low engine speed, etc., since the combustion frequency per unit time becomes low, the response of the torque reduction tends to degrade if the vehicle attitude control is performed.

SUMMARY OF THE DISCLOSURE

The present disclosure is made in view of solving the issues of the conventional arts described above, and aims to provide a vehicle control device, which suitably prevents a response of a torque reduction by a vehicle attitude control from degrading, by setting a torque reduction amount in the vehicle attitude control according to a combustion frequency of the engine per unit time.

According to one aspect of the present disclosure, a vehicle control device is provided, which includes an engine, an engine control mechanism configured to control torque generated by the engine, a processor configured to execute a vehicle attitude controlling module to control attitude of a vehicle by controlling the engine control mechanism to reduce the torque so as to decelerate the vehicle, when a condition that the vehicle is traveling and a steering angle related value that is related to a steering angle of a steering device increases is satisfied, and a torque reduction amount setting module to set the reduction amount of the torque to be larger as a combustion frequency of the engine per unit time decreases. The vehicle attitude controlling module controls the engine control mechanism to reduce the torque based on the set reduction amount.

With the above configuration, when executing the vehicle attitude control in which the torque is reduced according to the steering angle related value so as to decelerate the vehicle, the reduction amount of the torque is set to be larger as the combustion frequency of the engine per unit time decreases. Thus, in the case where the vehicle attitude control is performed when the combustion frequency of the engine is low, the torque reduction by the vehicle attitude control is suitably secured, that is, degradation of a response of the torque reduction is prevented. Therefore, according to this configuration, it is suitably prevented that a desired vehicle attitude in turning is not achieved and a driver feels a sense of discomfort due to executing the vehicle attitude control when the combustion frequency of the engine is low.

The engine may include a plurality of cylinders and have an operation mode in which a reduced-cylinder operation, in which combustion in one or some of the plurality of cylinders is suspended, is performed. The torque reduction amount setting module may set the reduction amount of the torque to be larger as the number of suspended cylinders is larger.

Although the combustion frequency of the engine per unit time decreases when the number of suspended cylinders in the reduced-cylinder operation is large with the above configuration, it is suitably prevented that the desired vehicle attitude in turning is not achieved and the driver feels a sense of discomfort due to executing the vehicle attitude control in such a case where the number of suspended cylinders is large.

The vehicle control device may further include an engine speed detector configured to detect a speed of the engine. The torque reduction amount setting module may set the reduction amount of the torque to be larger as the detected speed of the engine is lower.

Although the combustion frequency of the engine per unit time decreases when the speed of the engine becomes low with the above configuration, it is suitably prevented that the desired vehicle attitude in turning is not achieved and the driver feels a sense of discomfort due to executing the vehicle attitude control in such a case where the speed of the engine is low.

The vehicle control device may further include a steering angle sensor configured to detect the steering angle of the steering device. The vehicle attitude controlling module may determine that the steering angle related value increases when a change rate of the detected steering angle is higher than a given rate.

According to another aspect of the present disclosure, a vehicle control device is provided, which includes an engine, an engine control mechanism configured to control torque generated by the engine, and a processor configured to execute a vehicle attitude controlling module to control attitude of a vehicle by controlling the engine control mechanism to reduce the torque so as to decelerate the vehicle, when a condition that the vehicle is traveling and a steering angle related value that is related to a steering angle of a steering device increases is satisfied, and a torque reduction amount setting module to set the reduction amount of the torque to be larger when a combustion frequency of the engine per unit time is a first value than when the combustion frequency per unit time is a second value that is higher than the first value. The vehicle attitude controlling module controls the engine control mechanism to reduce the torque based on the set reduction amount.

With the above configuration, it is suitably prevented that the desired vehicle attitude in turning is not achieved and the driver feels a sense of discomfort due to executing the vehicle attitude control when the combustion frequency of the engine is low.

According to still another aspect of the present disclosure, a vehicle control device is provided, which includes an engine including a plurality of cylinders and configured to be switchable of an operation mode between a reduced-cylinder operation in which combustion in one or some of the plurality of cylinders is suspended and an all-cylinder operation in which combustion is performed in all of the plurality of cylinders, an engine control mechanism configured to control torque generated by the engine, a processor configured to execute a vehicle attitude controlling module to control attitude of a vehicle by controlling the engine control mechanism to reduce the torque so as to decelerate the vehicle, when a condition that the vehicle is traveling and a steering angle related value that is related to a steering angle of a steering device increases is satisfied, and a torque reduction amount setting module to set the reduction amount of the torque when the engine performs the reduced-cylinder operation to be larger than when the engine performs the all-cylinder operation. The vehicle attitude controlling module controls the engine control mechanism to reduce the torque based on the set reduction amount.

With the above configuration, it is suitably prevented that the desired vehicle attitude in turning is not achieved and the driver feels a sense of discomfort due to executing the vehicle attitude control in the reduced-cylinder operation.

DETAILED DESCRIPTION OF THE DISCLOSURE

Hereinafter, a vehicle control device according to one embodiment of the present disclosure is described with reference to the accompanying drawings.

<System Configuration>

Figure 1:
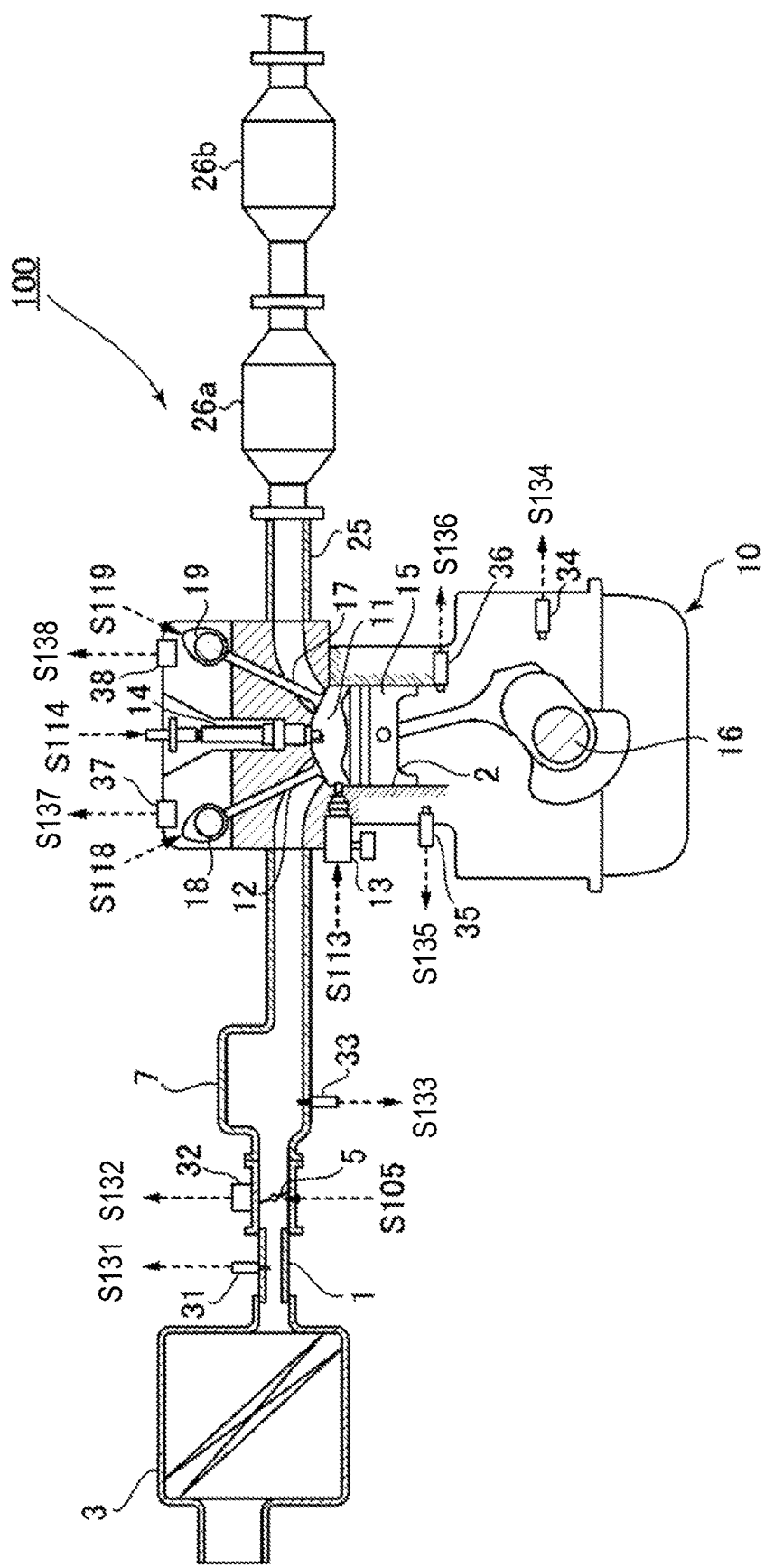
FIG. 1 is a schematic configuration view of an engine system to which a vehicle control device according to one embodiment of the present disclosure is applied.
Figure 2:
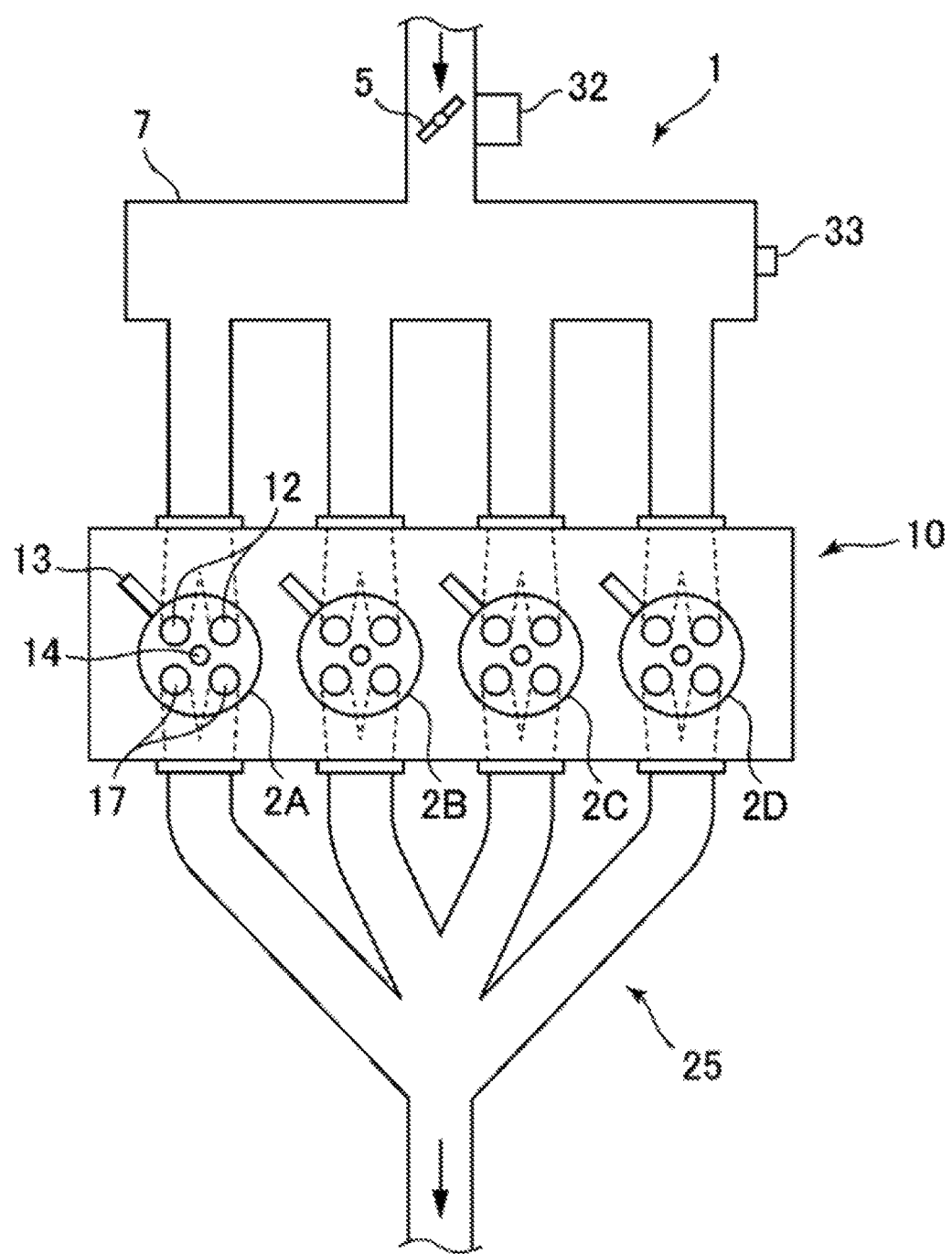
FIG. 2 is a schematic plan view of an engine according to the embodiment of the present disclosure.
Figure 3:
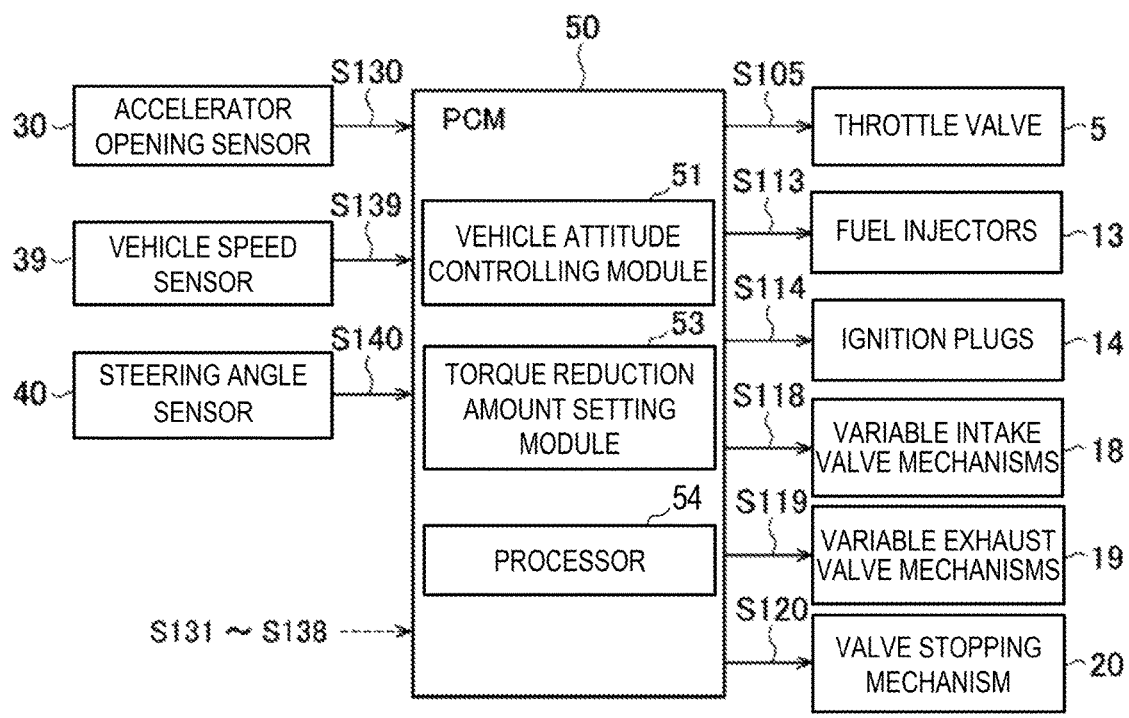
FIG. 3 is a block diagram illustrating an electric configuration of the vehicle control device according to the embodiment of the present disclosure.

First, an engine system to which the vehicle control device according to this embodiment is applied is described with reference to FIGS. 1 to 3. FIG. 1 is a schematic configuration view of the engine system to which the vehicle control device is applied according to the embodiment of the present disclosure. FIG. 2 is a schematic plan view of an engine according to the embodiment of the present disclosure. FIG. 3 is a block diagram illustrating an electric configuration of the vehicle control device according to the embodiment of the present disclosure.

As illustrated in FIGS. 1 and 3, an engine system 100 mainly has an intake passage 1 through which intake air (air) externally introduced passes, an engine 10 (particularly, a gasoline engine) configured to generate a driving force for a vehicle on which the engine 10 is mounted by combusting a mixture gas of the intake air supplied from the intake passage 1 and fuel supplied from a fuel injector 13 (described later), an exhaust passage 25 through which exhaust gas generated by the combustion inside the engine 10 is discharged, sensors 30 to 40 configured to detect various kinds of states regarding the engine system 100, and a PCM (Power-train Control Module) 50 configured to control the entire engine system 100.

In the intake passage 1, an air cleaner 3 configured to purify the externally introduced intake air, a throttle valve 5 configured to adjust an amount of intake air passing therethrough (intake air amount), and a surge tank 7 configured to temporarily store intake air to be supplied to the engine 10 are arranged in this order from upstream side.

As illustrated in FIG. 2, the engine 10 of this embodiment is an inline four-cylinder engine including four cylinders 2 (2A to 2D) arranged in line. This engine 10 also has an intake valve 12 (two intake valves for each cylinder in this embodiment) configured to introduce the intake air supplied from the intake passage 1 into a combustion chamber 11, the fuel injector 13 configured to inject the fuel into the combustion chamber 11, an ignition plug 14 configured to ignite the mixture gas of the intake air and the fuel supplied into the combustion chamber 11, a piston 15 configured to reciprocate by combustion of the mixture gas inside the combustion chamber 11, a crankshaft 16 configured to rotate by the reciprocation motion of the piston 15, and an exhaust valve 17 (two exhaust valves for each cylinder in this embodiment) configured to discharge the exhaust gas generated by the combustion of the mixture gas inside the combustion chamber 11 to the exhaust passage 25.

The piston 15 is provided in each of the cylinders 2A to 2D and they reciprocate with a phase difference of 180° in crank angle (180° CA) from each other. Accordingly, ignition timings of the respective cylinders 2A to 2D vary 180° CA from each other.

The engine 10 of this embodiment is a cylinder deactivation engine where an operation in which two of the four cylinders 2A to 2D are suspended while the remaining two cylinders operate, that is, a reduced-cylinder operation is performable.

For example, when the cylinder 2A is the first cylinder, the cylinder 2B is the second cylinder, the cylinder 2C is the third cylinder, and the cylinder 2D is the fourth cylinder in this order from the left side in FIG. 2, during an all-cylinder operation in which all of the four cylinders 2A to 2D are operated (in an all-cylinder operation mode), the ignition is performed in the order of the first cylinder 2A, the third cylinder 2C, the fourth cylinder 2D, and the second cylinder 2B.

Further, during the reduced-cylinder operation (in a reduced-cylinder operation mode), the ignition operation of the ignition plug 14 is prohibited for two of the cylinders of which the order of ignition is not successive (the first cylinder 2A and the fourth cylinder 2D in this embodiment), and the ignition is alternately performed in the remaining two cylinders (that is, the third cylinder 2C and the second cylinder 2B).

Moreover, the engine 10 is variable of operation timings of the intake valve 12 and the exhaust valve 17 (corresponding to valve phases) by a variable intake valve mechanism 18 and a variable exhaust valve mechanism 19 which are variable valve timing mechanisms, respectively. The variable intake valve mechanism 18 and the variable exhaust valve mechanism 19 may adopt various types of known mechanisms. For example, the operation timings of the intake and exhaust valves 12 and 17 may be varied using electromagnetic or hydraulic mechanisms.

The engine 10 also has a valve stopping mechanism 20 configured to stop opening and closing operations of the intake valves 12 and the exhaust valves 17 of the first cylinder 2A and the fourth cylinder 2D during the reduced-cylinder operation. The valve stopping mechanism 20 includes, for example, a so-called lost motion mechanism which intervenes between a cam and the valve, and enables or disables a transmission of a driving force of the cam to the valve. Alternatively, the valve stopping mechanism 20 may include two kinds of cams having different cam profiles, i.e., a first cam having a cam nose that performs an opening and closing operation of the valve and a second cam that stops the opening and closing operation, and a so-called cam shifting mechanism configured to selectively transmit an operation state of one of the first and second cams.

In the exhaust passage 25, exhaust purification catalysts 26a and 26b having an exhaust gas purifying function (such as a $NO_x$ catalyst, a three-way catalyst, or an oxidation catalyst) are mainly provided. Hereinafter, when referring to the exhaust purification catalysts 26a and 26b without distinguishing one from the other, they are simply referred to as "the exhaust purification catalyst 26."

Further, the engine system 100 is provided with the sensors 30 to 40 configured to detect the various kinds of states regarding the engine system 100. That is, the accelerator opening sensor 30 detects an accelerator opening that is an opening of an accelerator pedal (corresponding to a depression amount of the accelerator pedal by a vehicle driver). The airflow sensor 31 detects an intake air amount corresponding to a flow rate of the intake air that passes through the intake passage 1. The throttle opening sensor 32 detects a throttle opening that is an opening of the throttle valve 5. The pressure sensor 33 detects pressure inside an intake manifold corresponding to intake air pressure that is applied to the engine 10. The crank angle sensor 34 detects a crank angle of the crankshaft 16. The water temperature sensor 35 detects a temperature of a coolant that cools the engine 10 (water temperature). The temperature sensor 36 detects a temperature inside the cylinder 2 of the engine (in-cylinder temperature). The cam angle sensors 37 and 38 detect operation timings, including close timings, of the intake valve 12 and the exhaust valve 17, respectively. The vehicle speed sensor 39 detects a speed of the vehicle (vehicle speed). The steering angle sensor 40 detects a rotational angle of a steering wheel (steering angle). The steering wheel may be one example of the "steering device." Note that an engine speed is determined based on any of the values detected by the above sensors, and the sensor(s) of which a detection value is used for determining the engine speed may be referred to as the "engine speed detector." These various sensors 30 to 40 output to the PCM 50 detection signals S130 to S140 corresponding to the detected parameters.

The PCM 50 controls various components of the engine system 100 based on the detection signals S130 to S140 received from the various sensors 30 to 40 described above. For example, as illustrated in FIG. 3, the PCM 50 supplies a control signal S105 to the throttle valve 5 to control the open and close timings and opening of the throttle valve 5, supplies a control signal S113 to the fuel injector 13 to control a fuel injection amount and a fuel injection timing, supplies a control signal S114 to the ignition plug 14 to control the ignition timing, supplies control signals S118 and S119 to the variable intake valve mechanism 18 and the variable exhaust valve mechanism 19 to control the operation timings of the intake valve 12 and the exhaust valve 17, respectively, and supplies a control signal S120 to the valve stopping mechanism 20 to control the open and close operations of the intake and exhaust valves 12 and 17 of the first and fourth cylinders 2A and 2D. Note that the throttle valve 5, the fuel injector 13, the ignition plug 14, the variable intake valve mechanism 18, and the variable exhaust valve mechanism 19 may be examples of the "engine control mechanism."

In this embodiment, the PCM 50 has the following functional components. That is, the PCM 50 includes a vehicle attitude controlling module 51 configured to perform a vehicle attitude control in which the attitude of the vehicle is controlled by reducing a torque of the engine 10 to decelerate the vehicle when a condition that the vehicle is traveling and a steering angle related value which is related to a steering angle of the steering wheel (typically, a steering rate) increases (vehicle attitude control starting/executing condition) is satisfied. When a given condition for terminating the vehicle attitude control (vehicle attitude control terminating condition) is satisfied, the vehicle attitude controlling module 51 controls the engine 10 to bring the torque back to that before the vehicle attitude control. Note that the vehicle attitude control may suitably be referred to as a "torque reduction control."

The PCM 50 also includes a torque reduction amount setting module 53 configured to set an amount of torque reduced by the vehicle attitude controlling module 51 (torque reduction amount) according to a combustion frequency of the engine 10 per unit time. For example, the torque reduction amount setting module 53 sets the torque reduction amount based on an operation mode of the engine 10 (all-cylinder operation or reduced-cylinder operation) and the engine speed which affect the combustion frequency, without directly using the combustion frequency of the engine 10 per unit time. That is, the torque reduction amount setting module 53 sets the torque reduction amount to be larger during the reduced-cylinder operation than during the all-cylinder operation, and also larger as the engine speed decreases.

The respective components of the PCM 50 are configured by a computer including a processor 54 (e.g. a CPU (central processing unit)) and internal memory, such as ROM(s) and RAM(s) configured to store various programs which are interpreted and executed by the processor 54 (the programs include a basic control program (e.g., an OS) and an application program activated on the OS and configured to achieve a particular function), and various data. The processor 54 is configured to execute the vehicle attitude controlling module 51 and the torque reduction amount setting module 53 to perform their respective functions. These modules are stored in the internal memory as one or more software programs.

Figure 4:
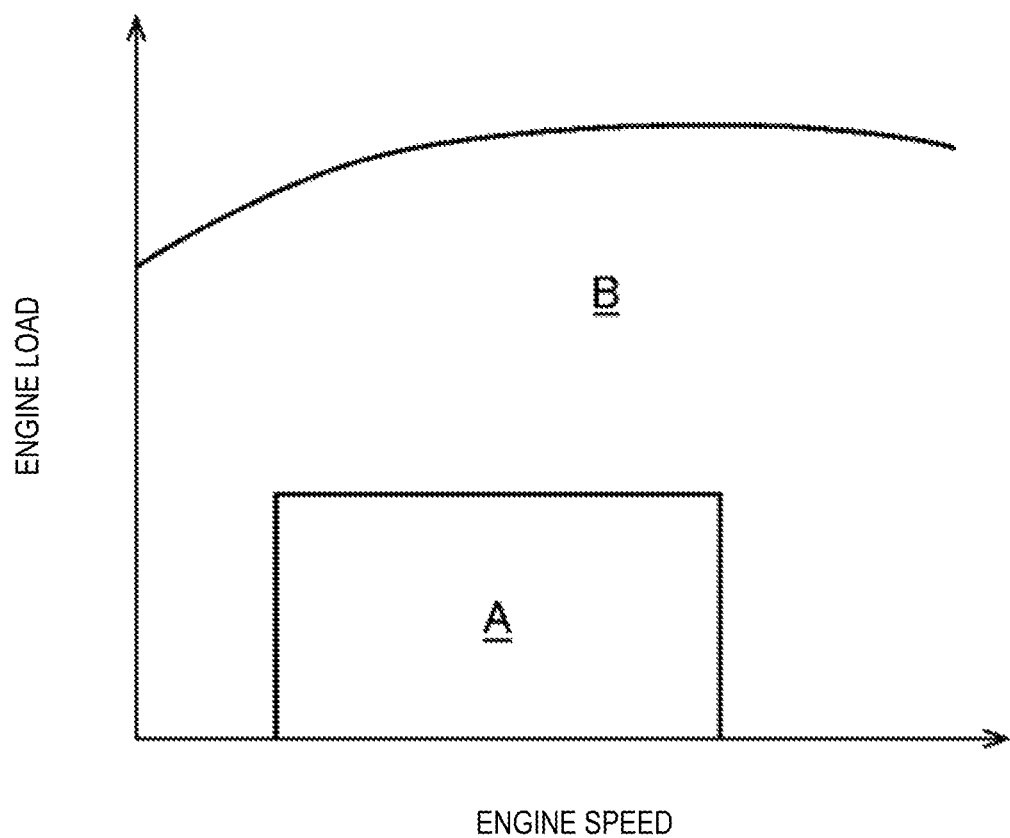
FIG. 4 is a map conceptually illustrating an operating range of the engine where an operation mode is switched according to the embodiment of the present disclosure.

Here, operating ranges of the engine where the reduced-cylinder operation and the all-cylinder operation are performed respectively in this embodiment are described with reference to FIG. 4. FIG. 4 is a map conceptually illustrating an operating range of the engine where the operation mode of the engine is switched (between the reduced-cylinder operation and the all-cylinder operation) according to the embodiment of the present disclosure, in which the horizontal axis indicates the engine speed and the vertical axis indicates an engine load.

As illustrated in FIG. 4, a reduced-cylinder operation range A where the reduced-cylinder operation is performed is set within a range where the engine speed and the engine load are relatively low, and an all-cylinder operation range B where the all-cylinder operation is performed is set outside the reduced-cylinder operation range. With reference to such a map, the PCM 50 determines which of the reduced-cylinder operation range A and the all-cylinder operation range B an engine speed and an engine load concerned correspond to. Based on the determination result, the PCM 50 controls the open and close operations of the intake and exhaust valves 12 and 17 of the first and fourth cylinders 2A and 2D so as to perform one of the reduced-cylinder operation and the all-cylinder operation.

<Contents of Control in this Embodiment>

Next, a control performed by the vehicle control device of this embodiment of the present disclosure is described with reference to FIGS. 5 to 8.

Figure 5:
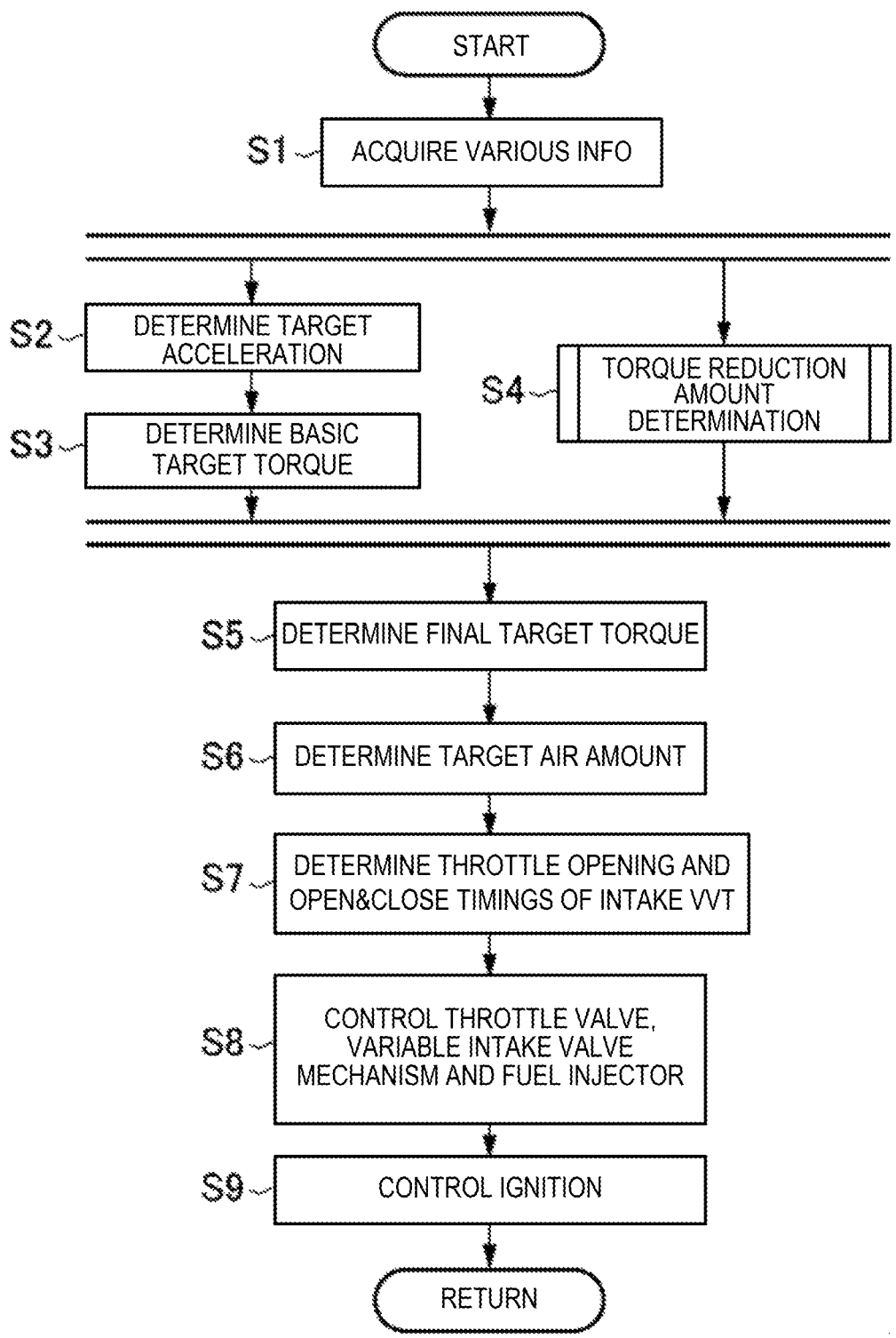
FIG. 5 is a flowchart illustrating an engine control according to the embodiment of the present disclosure.
Figure 6:
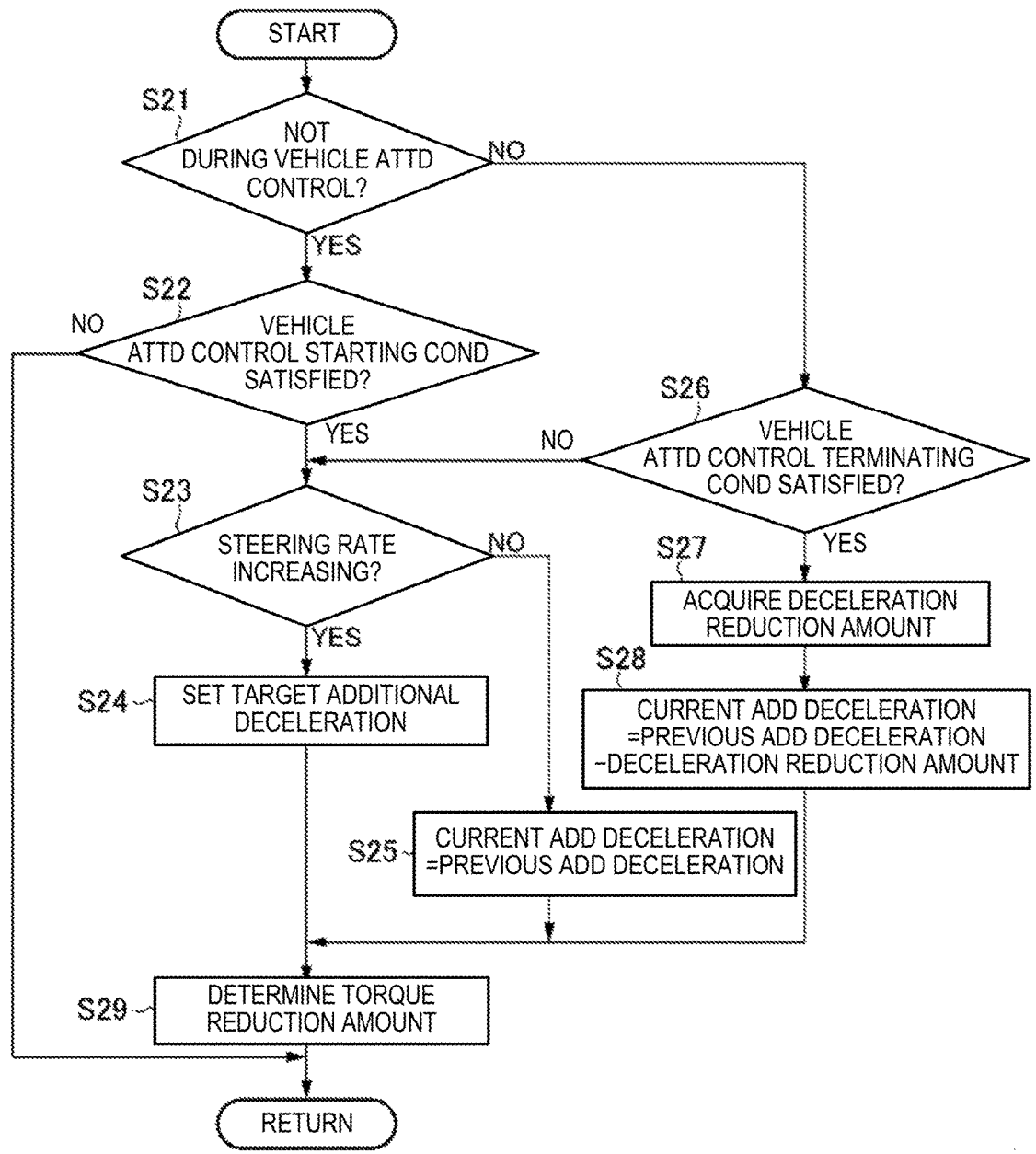
FIG. 6 is a flowchart illustrating a torque reduction amount determination according to the embodiment of the present disclosure.
Figure 7:
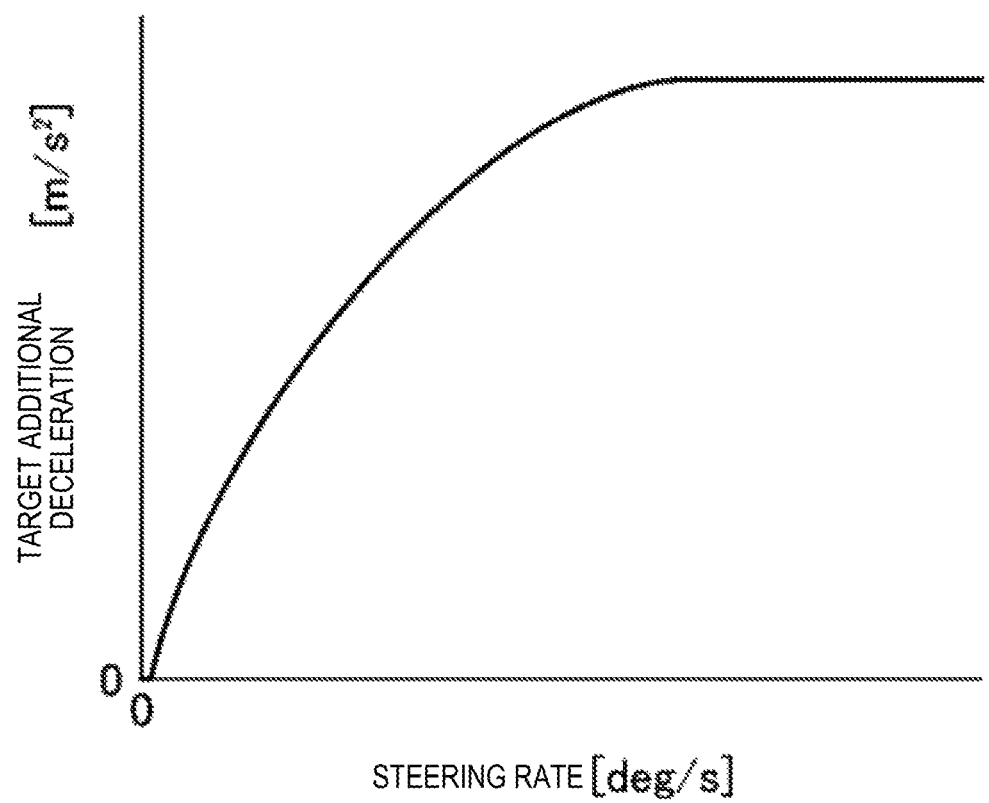
FIG. 7 is a map illustrating a relationship between a target additional deceleration and a steering rate according to the embodiment of the present disclosure.
Figure 8:
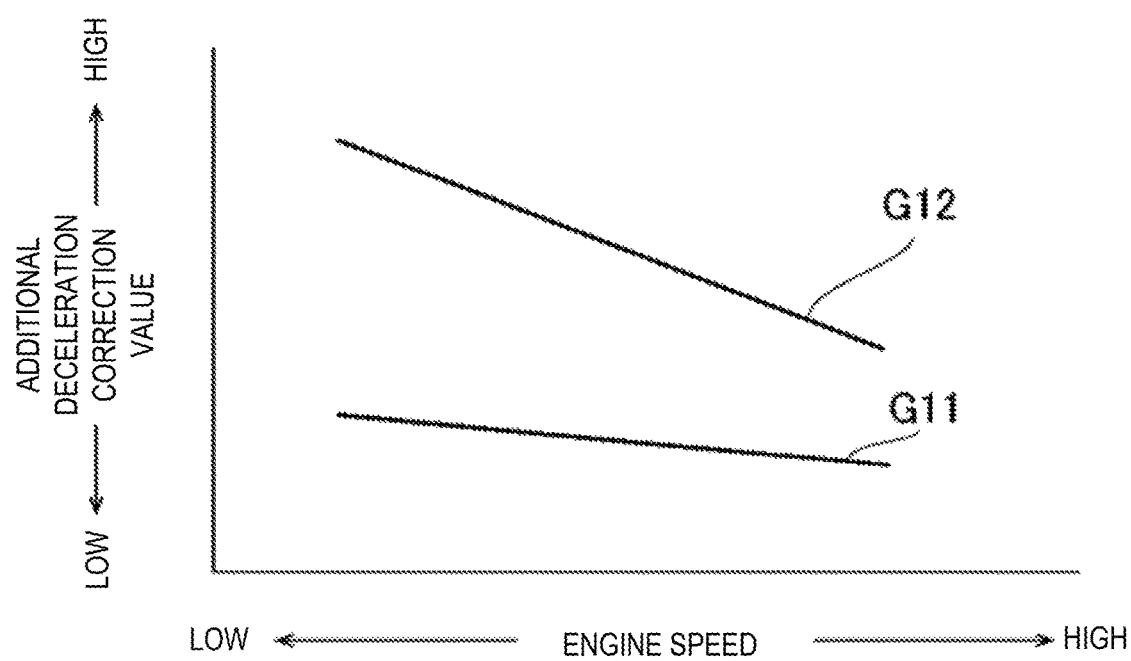
FIG. 8 is a correction map of an additional deceleration according to the embodiment of the present disclosure.

FIG. 5 is a flowchart illustrating an engine control according to the embodiment of the present disclosure. FIG. 6 is a flowchart illustrating a torque reduction amount determination according to the embodiment of the present disclosure. FIG. 7 is a map illustrating a relationship between a target additional deceleration and the steering rate according to the embodiment of the present disclosure. FIG. 8 is a correction map of an additional deceleration according to the embodiment of the present disclosure.

The engine control of FIG. 5 is activated when an ignition switch of the vehicle is turned ON, and power is supplied to a control device of the engine. The engine control is repeatedly performed, basically while the vehicle is traveling.

When the engine control is started, as illustrated in FIG. 5, the PCM 50 acquires an operating state of the vehicle at S1. For example, the PCM 50 acquires, as the operating state, the detection signals S130 to S140 outputted from the various sensors 30 to 40, including the accelerator opening detected by the accelerator opening sensor 30, the vehicle speed detected by the vehicle speed sensor 39, the steering angle detected by the steering angle sensor 40, and a gear position currently set in an automatic transmission of the vehicle. Further, the PCM 50 determines, based on the engine speed and the engine load, whether the engine 10 is in the reduced-cylinder operation or the all-cylinder operation. Note that the PCM 50 also acquires this operation mode as the operating state. Here, the PCM 50 determines the operation mode with reference to the map of FIG. 4.

Next, at S2, the PCM 50 sets a target acceleration based on the operating state of the vehicle including the accelerator pedal operation acquired at S1. For example, the PCM 50 selects an acceleration characteristic map corresponding to a current vehicle speed and gear position, from acceleration characteristic maps defined for various vehicle speeds and gear positions (they are created in advance and stored in memory, etc.). The PCM 50 determines the target acceleration corresponding to a current accelerator opening by referring to the selected acceleration characteristic map.

Next, at S3, the PCM 50 determines a basic target torque of the engine 10 for achieving the target acceleration determined at S2. Here, the PCM 50 determines the basic target torque within a torque range which is outputtable by the engine 10, based on the vehicle speed, the gear position, a road surface slope, a road surface μ, etc. at this time point.

In parallel to the processes at S2 and S3, the PCM 50 performs the torque reduction amount determination at S4 for determining the torque reduction amount of the vehicle attitude control (torque reduction control) based on the steering angle detected by the steering angle sensor 40. This torque reduction amount determination is described later in detail.

Next, at S5, the PCM 50 determines a final target torque based on the basic target torque determined at S3 and the torque reduction amount determined in the torque reduction amount determination at S4. For example, the PCM 50, upon determining the torque reduction amount in the torque reduction amount determination (i.e., the vehicle attitude control is performed), determines the final target torque by subtracting the torque reduction amount from the basic target torque. On the other hand, when the torque reduction amount is not determined in the torque reduction amount determination (i.e., the vehicle attitude control is not performed), the PCM 50 determines the basic target torque to be the final target torque as it is.

Next, at S6, the PCM 50 determines a target air amount and a target fuel amount for causing the engine 10 to output the final target torque determined at S5. Here, "air amount" means an amount of air introduced into the combustion chamber 11 of the engine 10. Alternatively, it may be a charging efficiency that is obtained by nondimensionalizing the air amount. For example, the PCM 50 calculates a target indicated torque obtained by adding to the final target torque a loss torque caused by a friction loss and a pumping loss, calculates the target fuel amount required for generating the target indicated torque, and based on the target fuel amount and a target equivalent ratio, determines the target air amount.

Next, at S7, in order to introduce to the engine 10 the air by the target air amount determined at S6, the PCM 50 determines the opening of the throttle valve 5 and the timings of the intake valve 12 to be opened and closed via the variable intake valve mechanism 18, in consideration of the air amount detected by the airflow sensor 31.

Next, at S8, the PCM 50 controls the throttle valve 5 and the variable intake valve mechanism 18 based on the throttle opening and the open and close timings of the intake valve 12 determined at S7, and also controls the fuel injector 13 based on the target fuel amount calculated at S6.

Next, at S9, based on the final target torque determined at S5 and an actual amount of air introduced into the combustion chamber 11 by the control of the throttle valve 5 and the variable intake valve mechanism 18 at S7, the PCM 50 sets an ignition timing so that the final target torque is outputted from the engine 10, and controls the ignition plug 14 to perform the ignition at the set ignition timing. After S9, the PCM 50 terminates the engine control.

Next, the torque reduction amount determination illustrated in FIG. 6 is described. This torque reduction amount determination is performed at S4 of FIG. 5.

When the torque reduction amount determination is started, at S21, the PCM 50 determines whether the vehicle attitude control is currently being performed. If the vehicle attitude control is not performed (S21: YES), the process proceeds to S22 where the PCM 50 determines whether the vehicle attitude control starting condition is satisfied. For example, the PCM 50 determines whether a change rate of the steering angle (which may be calculated based on the steering angle acquired at S1) is above a given start threshold. If the change rate of the steering angle is above the start threshold, that is, if the vehicle attitude control starting condition is satisfied (S22: YES), the process proceeds to S23. On the other hand, if the change rate of the steering angle is below the start threshold, that is, if the vehicle attitude control starting condition is not satisfied (S22: NO), the process is terminated.

Next, at S23, the PCM 50 determines whether the steering rate (the change rate of the steering angle) is increasing. As a result, if the steering rate is increasing (S23: YES), the process proceeds to S24 where the PCM 50 sets the target additional deceleration based on the steering rate. This target additional deceleration is a deceleration to be added to the vehicle according to the steering operation so that the vehicle behavior intended by the driver is accurately achieved.

Basically, the PCM 50 acquires the target additional deceleration corresponding to the current steering rate based on a relationship between the target additional deceleration and the steering rate illustrated in the map of FIG. 7. In FIG. 7, the horizontal axis indicates the steering rate and the vertical axis indicates the target additional deceleration. As illustrated in FIG. 7, the target additional deceleration corresponding to the steering rate increases as the steering rate increases. For example, as the steering rate increases, the target additional deceleration increases while the rate of the increase amount becomes lower (to be specific, gradually approaches to a given value).

In this embodiment, the PCM 50 corrects the target additional deceleration determined based on the map of FIG. 7, on the basis of the engine speed and the operation mode (the reduced-cylinder operation or the all-cylinder operation). For example, the PCM 50 corrects the target additional deceleration to be larger during the reduced-cylinder operation than during the all-cylinder operation, and also larger as the engine speed decreases. Such a correction of the target additional deceleration is described with reference to FIG. 8.

On the other hand, as a result of the determination at S23, if the steering rate is not increasing (S23: NO), that is, the steering rate is decreasing or constant, the process proceeds to S25 where the PCM 50 determines the additional deceleration determined in the previous processing as the additional deceleration in the current processing.

Moreover, as a result of the determination at S21, if the vehicle attitude control is already in execution (S21: NO), the process proceeds to S26 where the PCM 50 determines whether the vehicle attitude control terminating condition is satisfied. For example, the PCM 50 determines whether the change rate of the steering angle is below a given termination threshold. If the change rate of the steering angle is above the termination threshold, that is, if the vehicle attitude control terminating condition is not satisfied (S26: NO), the process proceeds to S23. In this case, the PCM 50 performs the processing of S23 and thereafter, in order to continue the vehicle attitude control.

On the other hand, if the change rate of the steering angle is below the termination threshold, that is, if the vehicle attitude control terminating condition is satisfied (S26: YES), the process proceeds to S27 where the PCM 50 acquires an amount of reducing in the current processing the additional deceleration determined in the previous processing (deceleration reduction amount). In one example, similar to the target additional deceleration, the PCM 50 calculates the deceleration reduction amount based on the reduction rate corresponding to the steering rate, by using the map as illustrated in FIG. 7. In another example, the PCM 50 calculates the deceleration reduction amount based on a constant reduction rate (e.g., 0.3 m/s$^3$) stored in advance in the memory, etc.

As described above, the target additional deceleration is corrected based on the engine speed and the operation mode. In a typical example, the PCM 50 determines the deceleration reduction amount to be applied when resuming the torque back to that before the vehicle attitude control so that the resume timing is substantially the same regardless of the corrected target additional deceleration.

Next, at S28, the PCM 50 determines the additional deceleration in the current processing by subtracting the deceleration reduction amount acquired at S27 from the additional deceleration determined in the previous processing.

After S24, S25, or S28, at S29, the PCM 50 determines the torque reduction amount based on the current additional deceleration determined at S24, S25, or S28. For example, the PCM 50 determines the torque reduction amount required for achieving the current additional deceleration, based on the current vehicle speed, gear position, road surface slope, etc. acquired at S1. After S29, the PCM 50 terminates the torque reduction amount determination and returns to the main routine.

Next, a method of correcting the target additional deceleration in the embodiment is described with reference to FIG. 8. In FIG. 8, the horizontal axis indicates the engine speed and the vertical axis indicates a correction value of the target additional deceleration (additional deceleration correction value). Further in FIG. 8, a graph G11 shows a map applied for the all-cylinder operation, and a graph G12 shows a map applied for the reduced-cylinder operation.

As described above, the correction of the target additional deceleration using such an additional deceleration correction value is performed at S24 of FIG. 6. That is, by applying the additional deceleration correction value to the target additional deceleration corresponding to the steering rate (see the map of FIG. 7), the target additional deceleration is corrected. Typically, this correction is performed by multiplying the target additional deceleration by the correction value. Here, as the correction value (absolute value) increases, the target additional deceleration is corrected to be larger, that is, the target additional deceleration (absolute value) is set to a higher value. When the target additional deceleration increases, the torque reduction amount increases and the final target torque is reduced more greatly.

As illustrated in FIG. 8, in this embodiment, during the reduced-cylinder operation, the additional deceleration correction value is set higher than during the all-cylinder operation. In addition, the additional deceleration correction value is set higher as the engine speed decreases. In this embodiment, when the engine 10 is in the reduced-cylinder operation and when the engine speed is low (i.e., when the combustion frequency of the engine 10 per unit time is low), the additional deceleration correction value is increased so that the change amount (and the change rate) of the target additional deceleration becomes larger. In this manner, degradation of a response of the torque reduction by the vehicle attitude control is prevented.

Note that although in FIG. 8 the additional deceleration correction value is continuously changed according to the engine speed, in another example, the additional deceleration correction value may be changed in a stepwise fashion according to the engine speed. For example, the additional deceleration correction value may be changed in a stepwise fashion depending on whether the engine speed is below or above a given speed.

<Operations and Effects>

Figure 9:
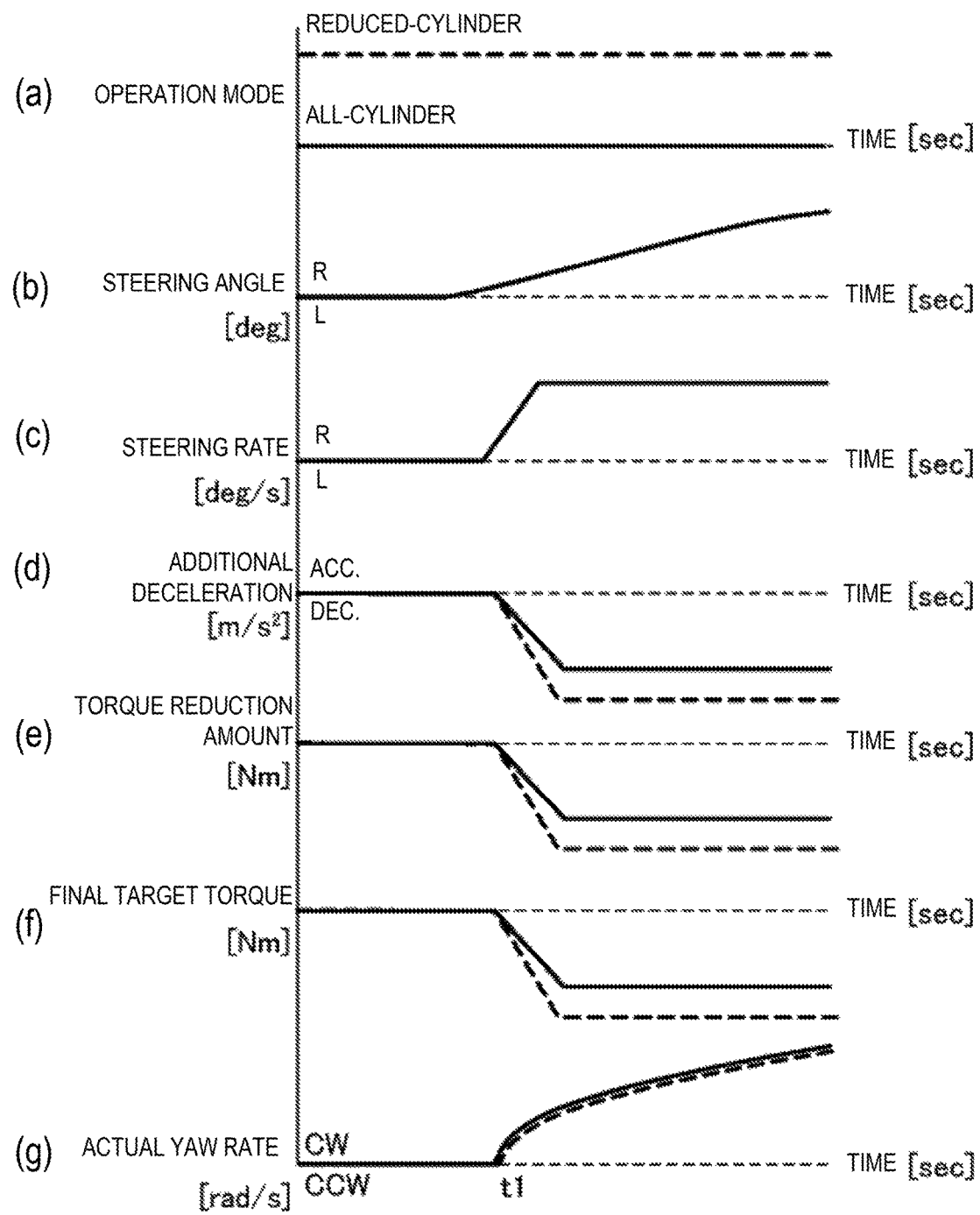
FIG. 9 is a time chart illustrating operations and effects of the vehicle control device according to the embodiment of the present disclosure.

Next, the operations and effects of the vehicle control device according to this embodiment of the present disclosure are described with reference to FIG. 9. FIG. 9 is a time chart illustrating a change of parameters related to the engine control over time in a case where the vehicle equipped with the vehicle control device of this embodiment makes a turn by a steering wheel operation. Here, a situation where the vehicle makes a right turn is illustrated.

Part (a) of FIG. 9 is a line chart illustrating a change in the operation mode of the engine 10, in which the horizontal axis indicates time and the vertical axis indicates the operation mode of the engine 10 (the reduced-cylinder operation mode or the all-cylinder operation mode). Hereinafter, a case where the vehicle attitude control is performed while the engine 10 performs the all-cylinder operation (solid line) and a case where the vehicle attitude control is performed while the engine 10 performs the reduced-cylinder operation (dashed line) are described.

Part (b) of FIG. 9 is a line chart illustrating a change in the steering angle of the vehicle making the right turn, in which the horizontal axis indicates time and the vertical axis indicates the steering angle. As illustrated in Part (b), after the rightward steering operation is started, the rightward steering angle gradually increases up to a largest angle as an additional steering-in operation is performed.

Part (c) of FIG. 9 is a line chart illustrating a change in the steering rate of the vehicle making the right turn as illustrated in Part (b), in which the horizontal axis indicates time and the vertical axis indicates the steering rate. The steering rate of the vehicle is expressed by a time differentiation of the steering angle of the vehicle. That is, as illustrated in Part (c) of FIG. 9, when the rightward steering is started, the rightward steering rate increases from zero and is then kept substantially constant.

Part (d) of FIG. 9 is a line chart illustrating a change in the additional deceleration determined based on the steering rate illustrated in Part (c), in which the horizontal axis indicates time and the vertical axis indicates the additional deceleration. In Part (d), the solid line indicates the additional deceleration applied for the all-cylinder operation, and the dashed line indicates the additional deceleration applied for the reduced-cylinder operation (the same definition of the solid and dashed lines is applied to Parts (e) to (g) as well).

Basically, when the vehicle attitude control starting condition in which the change rate of the steering angle is above the start threshold, the PCM 50 activates the vehicle attitude control to start increasing the additional deceleration (absolute value). For example, the PCM 50 determines the additional deceleration according to the steering rate by referring to the map illustrated in FIG. 7, and determines the additional deceleration correction value according to the operation mode (the reduced-cylinder operation or the all-cylinder operation) and the engine speed by referring to the map illustrated in FIG. 8. Further, the PCM 50 corrects the additional deceleration by the determined additional deceleration correction value to determine the ultimate additional deceleration to be applied. Here, since the determined additional deceleration correction value is higher during the reduced-cylinder operation than the all-cylinder operation (see FIG. 8), the change amount and the change rate of the additional deceleration become higher during the reduced-cylinder operation than the all-cylinder operation (see the solid and dashed lines in Part (d) of FIG. 9). Then, the PCM 50 keeps the additional deceleration once the steering rate becomes substantially constant.

Part (e) of FIG. 9 is a line chart illustrating a change in the torque reduction amount determined based on the additional deceleration illustrated in Part (d), in which the horizontal axis indicates time and the vertical axis indicates the torque reduction amount. The PCM 50 determines the torque reduction amount required for achieving the additional deceleration based on parameters such as the current vehicle speed, the gear position, the road surface slope, etc. Therefore, when these parameters are constant, the torque reduction amount is determined to change similarly to the change of the additional deceleration illustrated in Part (d) during the all-cylinder operation and the reduced-cylinder operation (see the solid and dashed lines of Part (e)).

Part (f) of FIG. 9 is a line chart illustrating a change in the final target torque determined based on the basic target torque and the torque reduction amount, in which the horizontal axis indicates time and the vertical axis indicates torque. The PCM 50 determines the final target torque by subtracting the torque reduction amount determined by the torque reduction amount determination from the basic target torque (here, the basic target torque is substantially fixed). Thus, during the reduced-cylinder operation and the all-cylinder operation, the change of the torque reduction amount illustrated in Part (e) is reflected on the final target torque (see the solid and dashed lines of Part (f)).

Part (g) of FIG. 9 illustrates a change of a yaw rate (actual yaw rate) which occurs in the vehicle when the engine 10 is controlled to achieve the final target torque in the case where the vehicle is steered as illustrated in Part (b). In Part (g), the horizontal axis indicates time and the vertical axis indicates the yaw rate.

Basically, when the rightward steering operation is started and the torque reduction amount is increased as the rightward steering rate increases (see Part (e) of FIG. 9), loads applied to the front wheels which are steerable wheels of the vehicle increases. As a result, a frictional force between the front wheels and the road surface increases, a cornering force of the front wheels increases, and turnability of the vehicle improves. Thus, as illustrated in Part (g) of FIG. 9, a relatively large yaw rate in a clockwise direction (CW) is generated in the vehicle.

Here, as described in the "Background of the Disclosure" section, during the reduced-cylinder operation, since the combustion time interval of the engine 10 is comparatively long, it is difficult for the engine 10 to suitably achieve the final target torque determined according to the torque reduction amount. That is, during the reduced-cylinder operation, since the time from the issuance of the torque reduction request until reaching the combustion timing of the cylinder 2 the first time is longer than that during the all-cylinder operation, the response of the torque reduction by the vehicle attitude control tends to degrade. Therefore, when the vehicle attitude control is performed during the reduced-cylinder operation, a yaw rate which occurs in the vehicle tends to become small, particularly, a change rate of the yaw rate tends to become gradual. As a result, a desired vehicle behavior in turning is not achieved and the driver feels a sense of discomfort.

In this regard, in this embodiment, during the reduced-cylinder operation, the change amount (and the change rate) of the additional deceleration is made larger than during the all-cylinder operation (see Part (d) of FIG. 9) as described above. Therefore, during the reduced-cylinder operation, the torque reduction amount becomes larger than during the all-cylinder operation (see Part (e) of FIG. 9), and the final target torque is greatly reduced (see Part (f) of FIG. 9). Therefore, according to this embodiment, during the reduced-cylinder operation, the torque reduction by the vehicle attitude control is suitably secured, that is, the degradation of the response of the torque reduction caused by the vehicle attitude control during the reduced-cylinder operation is prevented. As a result, according to this embodiment, during the reduced-cylinder operation, a large yaw rate similar to during the all-cylinder operation occurs in the vehicle (see the solid and dash lines of Part (g) of FIG. 9). Thus, according to this embodiment, it is suitably prevented that the desired vehicle behavior in turning is not achieved and the driver feels a sense of discomfort due to executing the vehicle attitude control during the reduced-cylinder operation.

<Modifications>

Next, various modifications of the embodiment described above are described.

In the above embodiment, the additional deceleration is determined using the map defining the additional deceleration to be set according to the steering rate (see FIG. 7). Further, the additional deceleration correction value is determined using the map defining the additional deceleration correction value to be set according to the operation mode of the engine 10 (the reduced-cylinder operation or the all-cylinder operation) and the engine speed (see FIG. 8). Moreover, the additional deceleration to be applied is determined by correcting it with the additional deceleration correction value. In another example, instead of the two maps, a single map defining the additional deceleration to be set according to the steering rate, the operation mode of the engine 10, and the engine speed may be used. That is, without limiting the determination of the additional deceleration to the manner of correction, the additional deceleration may be determined directly based on the parameters described above.

Further in the above embodiment, the torque reduction amount by the vehicle attitude control is increased through determining the additional deceleration by taking into consideration the operation mode of the engine 10 and the engine speed. In another example, the additional deceleration may be determined based only on the steering rate so that the torque reduction amount corresponding to the additional deceleration is used for determining the final target torque. During the process of this determination, processing (correction) may be performed so that the reduction amount of the final target torque increases according to the operation mode of the engine 10 and the engine speed.

In the above embodiment, in increasing the torque reduction amount, which is generated by the vehicle attitude control, to be larger during the reduced-cylinder operation than the all-cylinder operation, the torque reduction rate (change rate) is also increased (e.g., see FIG. 9). In the example illustrated in FIG. 9, the period for which the torque is reduced is made the same between the reduced-cylinder operation and the all-cylinder operation. In another example, only the torque reduction amount may be made different and the torque reduction rate (change rate) may be made the same between the reduced-cylinder operation and the all-cylinder operation. Here, the period for which the torque is reduced may be made longer during the reduced-cylinder operation than the all-cylinder operation so that the final torque reduction amount becomes larger during the reduced-cylinder operation than the all-cylinder operation. In such a case, although the actual reduction of the engine torque during the reduced-cylinder operation tends to be later than during the all-cylinder operation, the engine torque promptly reaches the engine torque level after reduction during the all-cylinder operation and it is prevented that the driver feels a sense of discomfort.

In the above embodiment, the present disclosure is applied to the engine 10 (four-cylinder engine) having two operation modes of the reduced-cylinder operation and the all-cylinder operation. With this engine 10, the reduced-cylinder operation mode is configured by suspending two of the cylinders 2A to 2D and operating the remaining two cylinders. In another example, the present disclosure may be applied to an engine having two or more operation modes as the reduced-cylinder operation. For example, in a case of applying to a six-cylinder engine, it is capable of achieving, in addition to an all-cylinder operation mode in which all the six cylinders are operated, two reduced-cylinder operation modes including a mode where two cylinders are suspended while the remaining four cylinders are operated and a mode where three cylinders are suspended while the remaining three cylinders are operated. In the case where the present disclosure is applied to the engine having two or more reduced-cylinder operation modes, the torque reduction amount generated by the vehicle attitude control may be increased as the number of suspended cylinders becomes larger.

In the above embodiment, the torque reduction amount by the vehicle attitude control is set based on both the operation mode of the engine 10 (the reduced-cylinder operation or the all-cylinder operation) and the engine speed. In another example, the torque reduction amount by the vehicle attitude control may be set based only on one of the operation mode of the engine 10 and the engine speed. In still another example, instead of the operation mode of the engine 10 and the engine speed, the torque reduction amount by the vehicle attitude control may be set by directly using the combustion frequency of the engine 10 per unit time. In this example, the number of times that the combustion is performed in the engine 10 is counted (e.g., by using an in-cylinder pressure sensor, etc.), and the torque reduction amount by the vehicle attitude control may be set larger as the counted number is lower. Alternatively, when the counted number is less than a given value, the torque reduction amount by the vehicle attitude control may be set larger than when the counted number is higher than the given value.

In the above embodiment, the vehicle attitude control is performed based on the steering angle and the steering rate. However, in another example, instead of the steering angle and the steering rate, the vehicle attitude control may be performed based on the yaw rate or a lateral acceleration. These steering angle, steering rate, yaw rate, and lateral acceleration are examples of the "steering angle related value."

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Intake Passage
2 (2A-2D) Cylinder
5 Throttle Valve
10 Engine
13 Fuel Injector
14 Ignition Plug
18 Variable Intake Valve Mechanism
20 Valve Stopping Mechanism
30 Accelerator Opening Sensor
39 Vehicle Speed Sensor
50 PCM (Power-train Control Module)
51 Vehicle Attitude Controlling Module
53 Torque Reduction Amount Setting Module
100 Engine System

What is claimed is:

1. A vehicle control device, comprising:
an engine;
an engine control mechanism configured to control torque generated by the engine; and
a processor configured to execute:
a vehicle attitude controlling module to control attitude of a vehicle by controlling the engine control mechanism to reduce the torque so as to decelerate the vehicle, when a condition that the vehicle is traveling and a steering angle related value that is related to a steering angle of a steering device increases is satisfied; and
a torque reduction amount setting module to set the reduction amount of the torque to be larger as a combustion frequency of the engine per unit time decreases,
wherein the vehicle attitude controlling module controls the engine control mechanism to reduce the torque based on the set reduction amount.

2. The vehicle control device of claim 1, wherein
the engine includes a plurality of cylinders and has an operation mode in which a reduced-cylinder operation in which combustion in one or some of the plurality of cylinders is suspended is performed, and
the torque reduction amount setting module sets the reduction amount of the torque to be larger as the number of suspended cylinders is larger.

3. The vehicle control device of claim 2, further comprising an engine speed detector configured to detect a speed of the engine,
wherein the torque reduction amount setting module sets the reduction amount of the torque to be larger as the detected speed of the engine is lower.

4. The vehicle control device of claim 3, further comprising a steering angle sensor configured to detect the steering angle of the steering device,
wherein the vehicle attitude controlling module determines that the steering angle related value increases when a change rate of the detected steering angle is higher than a given rate.

5. The vehicle control device of claim 1, further comprising an engine speed detector configured to detect a speed of the engine,
wherein the torque reduction amount setting module sets the reduction amount of the torque to be larger as the detected speed of the engine is lower.

6. The vehicle control device of claim 5, further comprising a steering angle sensor configured to detect the steering angle of the steering device,
wherein the vehicle attitude controlling module determines that the steering angle related value increases when a change rate of the detected steering angle is higher than a given rate.

7. The vehicle control device of claim 1, further comprising a steering angle sensor configured to detect the steering angle of the steering device,
wherein the vehicle attitude controlling module determines that the steering angle related value increases when a change rate of the detected steering angle is higher than a given rate.

8. A vehicle control device, comprising:
an engine;
an engine control mechanism configured to control torque generated by the engine; and
a processor configured to execute:
a vehicle attitude controlling module to control attitude of a vehicle by controlling the engine control mechanism to reduce the torque so as to decelerate the vehicle, when a condition that the vehicle is traveling and a steering angle related value that is related to a steering angle of a steering device increases is satisfied; and
a torque reduction amount setting module to set the reduction amount of the torque to be larger when a combustion frequency of the engine per unit time is a first value than when the combustion frequency per unit time is a second value that is higher than the first value, wherein the vehicle attitude controlling module controls the engine control mechanism to reduce the torque based on the set reduction amount.

9. A vehicle control device, comprising:
an engine including a plurality of cylinders and configured to be switchable of an operation mode between a reduced-cylinder operation in which combustion in one or some of the plurality of cylinders is suspended and an all-cylinder operation in which combustion is performed in all of the plurality of cylinders;
an engine control mechanism configured to control torque generated by the engine; and
a processor configured to execute:
 a vehicle attitude controlling module to control attitude of a vehicle by controlling the engine control mechanism to reduce the torque so as to decelerate the vehicle, when a condition that the vehicle is traveling and a steering angle related value that is related to a steering angle of a steering device increases is satisfied; and
 a torque reduction amount setting module configured to set the reduction amount of the torque to be larger when the engine performs the reduced-cylinder operation than when the engine performs the all-cylinder operation,
wherein the vehicle attitude controlling module controls the engine control mechanism to reduce the torque based on the set reduction amount.

* * * * *